O. A. HOKANSON.
RIBBON SPOOL FOR TYPEWRITERS.
APPLICATION FILED APR. 17, 1919.
1,366,182.
Patented Jan. 18, 1921.
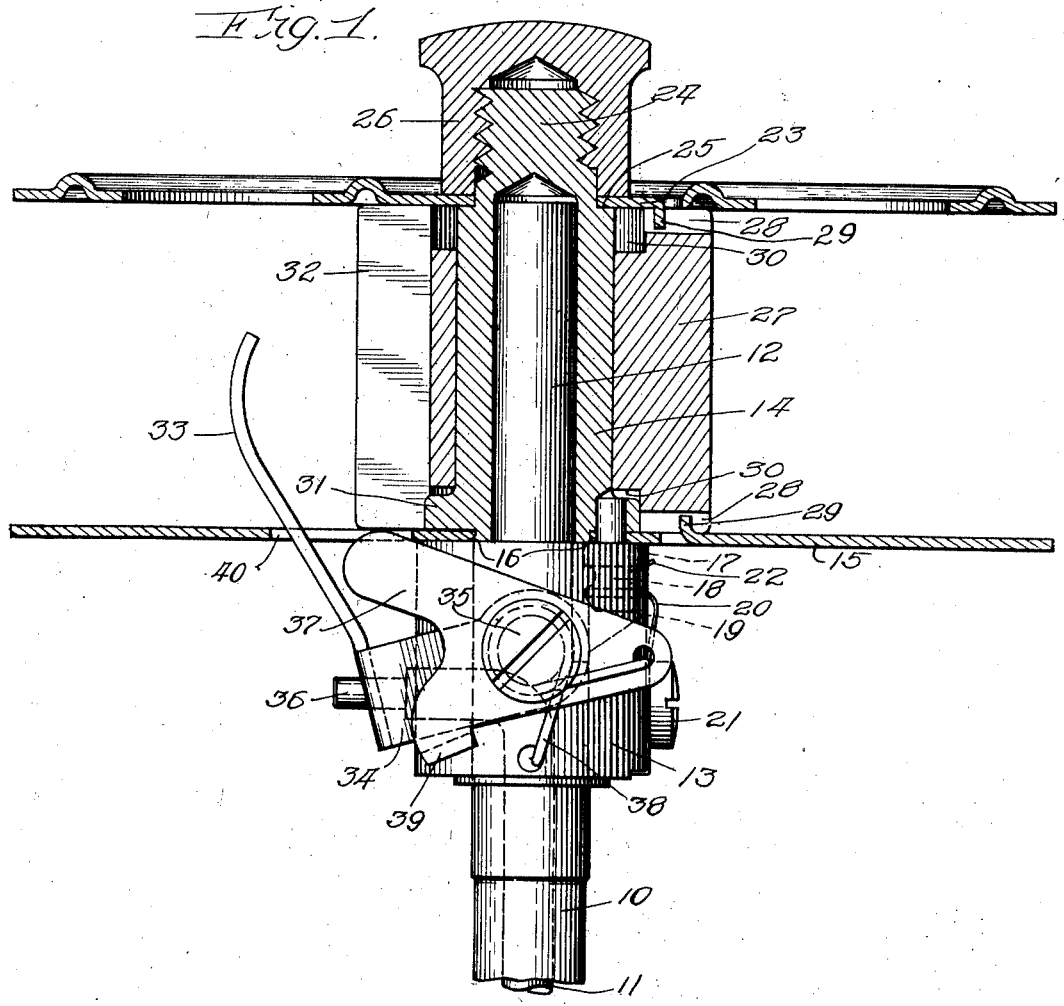
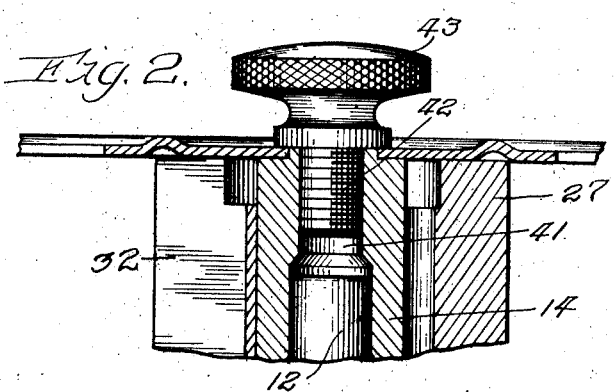

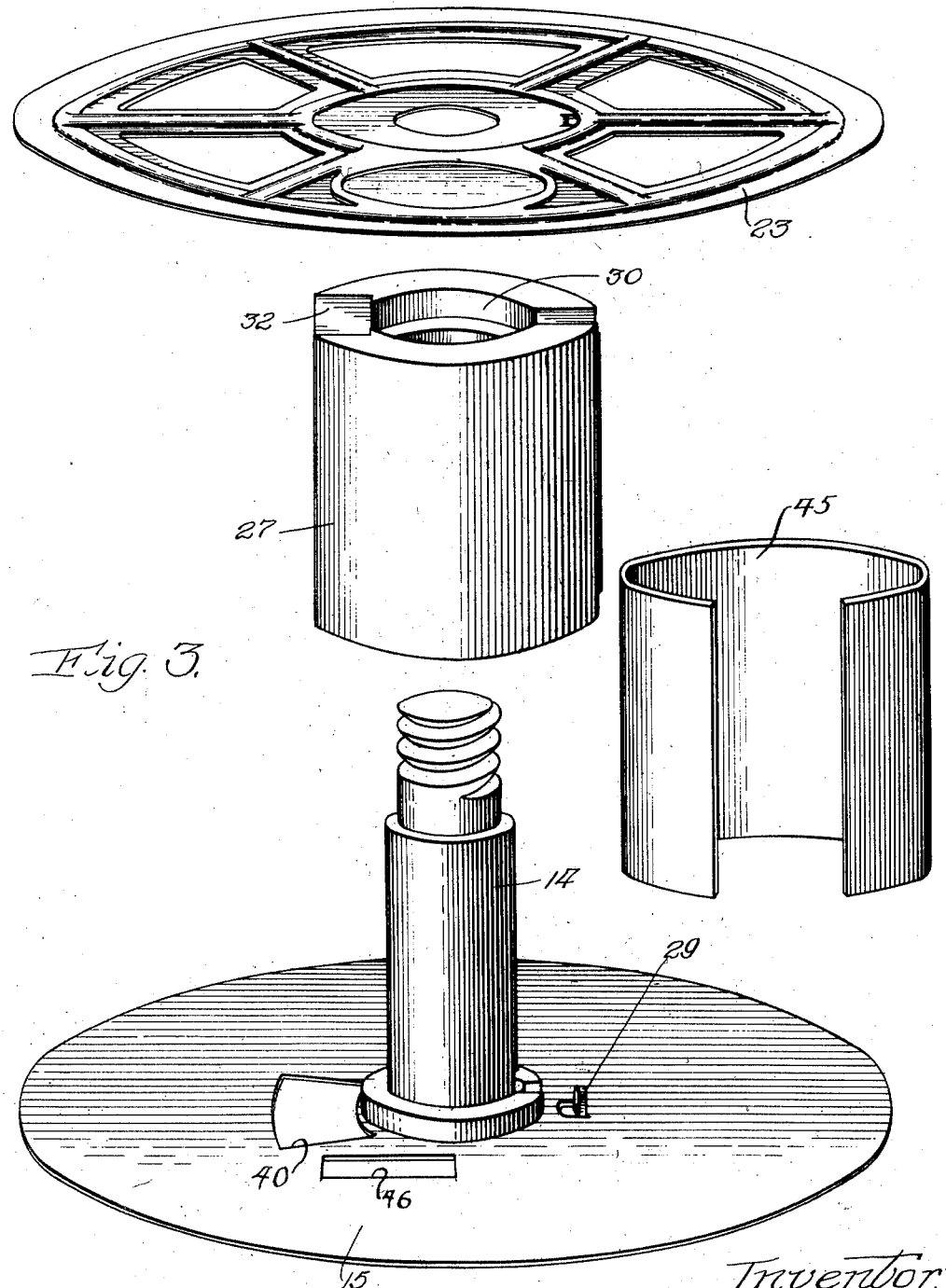

UNITED STATES PATENT OFFICE.

OTTO A. HOKANSON, OF WOODSTOCK, ILLINOIS, ASSIGNOR TO WOODSTOCK TYPEWRITER COMPANY, OF WOODSTOCK, ILLINOIS, A CORPORATION OF ILLINOIS.

RIBBON-SPOOL FOR TYPEWRITERS.

1,366,182.           Specification of Letters Patent.      Patented Jan. 18, 1921.

Application filed April 17, 1919. Serial No. 290,817.

*To all whom it may concern:*

Be it known that I, OTTO A. HOKANSON, a citizen of the United States, residing at Woodstock, in the county of McHenry and State of Illinois, have invented certain new and useful Improvements in Ribbon-Spools for Typewriters, of which the following is a specification.

This invention has for its object the provision of a device of the class named which shall be of improved construction and operation.

The invention is exemplified in the combination and arrangement of parts shown in the accompanying drawings and described in the following specification, and it is more particularly pointed out in the appended claims.

In the drawings,

Figure 1 is a vertical sectional view of a typewriter spool showing one embodiment of the present invention.

Fig. 2 is a fragmentary sectional view of a slightly modified form of the invention.

Fig. 3 is a perspective view of the parts of the spool shown in Fig. 1, the parts being disassembled.

In Fig. 1 of the drawings, the numeral 10 designates the spool carrying spindle of a typewriter which projects upwardly from the frame of a typewriter and is provided with any well known form of rotating mechanism for feeding the ribbon. The spindle 10 is centrally bored to receive a rod 11 for operating the reversing mechanism of the ribbon feed in a manner well known in the art. The upper end of the spindle 10 which receives the ribbon spool is somewhat reduced, as shown at 12, and just below the reduced portion 12 is a collar 13 rigidly fixed to the spindle 10. The ribbon spool proper comprises a central member 14 to which the lower spool flange 15 is riveted, as shown at 16. A plug 17 is rigidly secured to the central member 14 of the spool and to the lower flange 15, and the lower end of the plug 17 is provided with a circumferential groove 18 and a tapered head 19. The collar 13 is milled to provide an opening to receive the plug 17 and a flat spring 20 is secured to the collar 13 by a screw 21 and is bent to form a tooth 22 for entering the groove 18 when the ribbon spool is in place on the spindle 10.

The upper flange 23 of the ribbon spool fits over a threaded extension 24 of the central member 14 and rests upon a shoulder 25. A nut 26 is threaded on the member 24 and clamps the flange 23 to the central member 14 of the spindle. A core member 27 slides into and out of position over the member 14. The core 27 is provided with radially extending grooves 28 at its opposite ends which fit over lugs 29 struck out from the flanges 15. Both ends of the core 27 are provided with grooves 28 so that the core may be placed in position either end up and fit over the lugs 29 so that the core 27 and upper flange 23 will be held from rotation relative to the other parts of the spool. Both ends of the core 28 are also grooved adjacent the central opening of the core, as shown at 30, to fit over the lower flange 31 at the base of the central member 14 of the spool. One side of the core 27 is cut away to provide a notch 32 for receiving a tongue 33 which operates the rod 11. The lower end of the tongue 33 is provided with inwardly extending arms 34 which are pivoted at 35 to the collar 13. The rod 11 is provided with a pin 36 which extends through an opening in the yoke member connecting the arms 34 so that when the tongue 33 is moved inwardly and outwardly, the rod 11 will be raised and lowered reversing the ribbon feed. When the ribbon is wound upon the core 27, the tongue 33 will be held in the notch 32 and the rod 11 will be held in its uppermost position. When the ribbon is unwound from the core 27, the tongue 33 will drop outwardly and downwardly, as shown in Fig. 1, and lower the rod 11.

A lever 37 is pivoted coaxially with the arms 34 and is provided with a spring 38 which normally tends to rotate the lever 37 in a clockwise direction as viewed in Fig. 1. The lever 37 is provided with an inwardly projecting lug 39 which extends under one of the arms 34 so that when the lever 37 rotates under the influence of the spring 38, the arms 34 will be raised and the tongue 33 moved to its innermost position.

It will be apparent that the entire ribbon spool with the parts in their assembled relation may be lifted from the spindle 12 by simply grasping the spool and raising it upwardly. When this is done the spring 20 will move out of engagement with the groove 22 and free the spool from the collar 13. When the spool has been removed, the spring 38 will rotate the lever 37 and move the tongue 33 into its innermost position so that the tongue will not interfere with the spool when it is again replaced upon the spindle. The flange 15 is provided with an opening 40 to accommodate the tongue 33.

After the spool has been removed from the spindle, the nut 26 may be removed from the threaded portion 24 and the core 27 slid from the central portion 14 of the spool, as shown in Fig. 3. Typewriter ribbons may be furnished by the manufacturer wound upon wooden cores 27 and all that is necessary in replacing a worn ribbon is to remove the flange 23 from the spool, as shown in Fig. 3, after which the old ribbon with its core 27 may be taken off and a new ribbon placed in position upon the spindle 14. The flange 25 may then be replaced and the nut 26 threaded upon the screw 24 and the spool returned to its place upon the spindle 12. This avoids the necessity of providing a new spool with the ribbons furnished for use in connection with the typewriter.

In the modification shown in Fig. 2, the spindle 12 is made shorter than the spindle shown in Fig. 1 and the central portion 14 of the spool is provided with an internally threaded opening 41 which receives a threaded stud 42 of a screw 43. In other respects the modification shown in Fig. 2 is similar to that of the other figures.

The ribbon is removably secured to the core 27 by a spring sleeve 45, shown in Fig. 3. If desired, the core 27 may be removed from the central member 14 without displacing the entire spool from the spindle 12 by first unscrewing the cap 26 and taking off the upper flange 23. A slot 46 is provided in the lower flange 15 to permit operation of the lever 37 when the core 27 is removed without displacing the lower flange.

I claim:

1. The combination with a ribbon spool support, of a ribbon spool movable into and out of position on said support, means for detachably securing said spool in position on said support, said spool comprising a central member movable with said spool into and out of position on said support, a core member movable into and out of position on said central member, a removable flange, and a securing device arranged to engage said central member and to hold said core and flange in position on said spool when said spool is on or off of said support.

2. In combination, a typewriter spool comprising a central member having an opening therein for engaging a spool support, a flange fixedly secured to one end of said central member, a ribbon carrying core having an opening therein for receiving said central member when said core is in position on said spool, means for holding said core against rotation relative to said spool, a removable flange for said spool, and threaded means for engaging said central member for holding said removable flange in position on said spool independently of the connection of said spool with its spool support.

3. In combination, a typewriter spool comprising a central member having an opening therein for engaging a spool support, a flange fixedly secured to one end of said central member, a ribbon carrying core movable into and out of position on said central member, said core having stops formed on opposite ends thereof for preventing rotation of said core relative to said spool, means on said fixed flange for engaging one of said stops, a second flange arranged to removably engage the end of said central member opposite said first-mentioned flange to hold said core in place on said spool, and threaded means engaging said central member for securing said removable flange in position thereon irrespective of the connection of said spool with its support.

4. In combination, a typewriter ribbon spool support having a spindle thereon, a ribbon spool comprising a central member provided with an opening for engaging said spindle, said spool having a fixed flange secured to one end of said central member and a removable flange connected with the opposite end of said central member, a threaded member for holding said flange in place on said central member, a ribbon-carrying core held in place on said central member by said flange and threaded member, means for preventing rotation of said core relative to said spool, and a spring catch for detachably holding said spool in place on said spindle.

In testimony whereof I have signed my name to this specification on this 14th day of April, A. D. 1919.

OTTO A. HOKANSON.